(12) United States Patent  
Jia

(10) Patent No.: US 8,681,866 B1
(45) Date of Patent: Mar. 25, 2014

(54) METHOD AND APPARATUS FOR ENCODING VIDEO BY DOWNSAMPLING FRAME RESOLUTION

(75) Inventor: Wei Jia, San Jose, CA (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 13/095,968

(22) Filed: Apr. 28, 2011

(51) Int. Cl.
*H04N 7/12* (2006.01)
*H04N 11/02* (2006.01)
*H04N 11/04* (2006.01)

(52) U.S. Cl.
USPC ............. 375/240.13; 375/240.01; 375/240.29

(58) Field of Classification Search
USPC ........................................ 375/240.01–240.29
See application file for complete search history.

(56) References Cited

U.S. PATENT DOCUMENTS

2005/0238243 A1* 10/2005 Kondo et al. ................. 382/239

OTHER PUBLICATIONS

"Series H: Audiovisual and Multimedia Systems; Infrastructure of audiovisual services—Coding of moving video; Advanced video coding for generic audiovisual services". H.264. Version 1. International Telecommunication Union. Dated May 2003.
"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services—Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

(Continued)

*Primary Examiner* — Dave Czekaj
*Assistant Examiner* — Nam Pham
(74) *Attorney, Agent, or Firm* — Young Basile Hanlon & MacFarlane P.C.

(57) ABSTRACT

The subject invention has both apparatus and method aspects. A first embodiment of the method aspect is for encoding a video signal having a plurality of frames, each frame having a plurality of blocks. The method includes identifying a first frame from the plurality of frames as an I-frame, the first frame having an original resolution. The method also includes determining a variance for the first frame using a processor. If the variance exceeds an intra threshold: (a) selecting a frame resolution for the first frame that is less than the original resolution, and (b) encoding the first frame using the selected frame resolution is performed.

24 Claims, 6 Drawing Sheets

(56) References Cited

OTHER PUBLICATIONS

"Series H: Audiovisual and Multimedia Systems; Infrastructure of audiovisual services—Coding of moving video". H.264. Advanced video coding for generic audiovisual services. International Telecommunication Union. Version 12. Dated Mar. 2010.

"Implementors' Guide; Series H: Audiovisual and Multimedia Systems; Coding of moving video: Implementors Guide for H.264: Advanced video coding for generic audiovisual services". H.264. International Telecommunication Union. Version 12. Dated Jul. 30, 2010.

"VP8 Data Format and Decoding Guide". WebM Project. Google On2. Dated: Dec. 1, 2010.

\* cited by examiner

US 8,681,866 B1

METHOD AND APPARATUS FOR ENCODING VIDEO BY DOWNSAMPLING FRAME RESOLUTION

TECHNICAL FIELD

The present invention relates in general to video signal transmission and particularly to the encoding and decoding of such a signal.

BACKGROUND

An increasing number of applications today make use of digital video signals for various purposes including, for example, business meetings between people in remote locations via video conferencing, high definition video entertainment, video advertisements, and sharing of user-generated videos. As technology is evolving, users have higher expectations for video quality and resolution even when video signals are transmitted over communications channels having limited bandwidth.

To permit transmission of digital video streams while limiting bandwidth consumption, a number of video compression schemes have been devised, including formats such as VPx, promulgated by Google Inc. of Mountain View, Calif., and H.264, a standard promulgated by ITU-T Video Coding Experts Group (VCEG) and the ISO/IEC Moving Picture Experts Group (MPEG), including present and future versions thereof. H.264 is also known as MPEG-4 Part 10 or MPEG-4 AVC (formally, ISO/IEC 14496-10).

These compression schemes can use quantization techniques on frames of a digital video stream to reduce the bitrate (i.e. data size) of the encoded digital video stream. These quantization techniques discard part of a frame's data using standard computations, thereby reducing the frame's bitrate. Although these quantization techniques reduce the bitrate, they may not suitably maintain the quality of the video signal.

SUMMARY

Disclosed herein are embodiments of methods and apparatuses for encoding a video signal.

One aspect of the disclosed embodiments is a method for encoding a video signal having a plurality of frames, each frame having a plurality of blocks. The encoding method includes identifying a first frame from the plurality of frames as an I-frame, the first frame having an original resolution, determining a variance for the first frame using a processor, and if the variance exceeds an intra threshold: selecting a frame resolution for the first frame that is less than the original resolution, and encoding the first frame using the selected frame resolution.

Another aspect of the disclosed embodiments is a method for determining at least one threshold used for encoding a video signal having a plurality of frames, each frame having a plurality of blocks. The method further includes identifying a test sequence of frames, the frames in the test sequence of frames having an original resolution. The method further includes calculating at least one variance for at least one frame in the test sequence and calculating at least one first PSNR for the at least one frame using the original resolution. The method further includes determining the at least one threshold using the variances and first PSNRs.

Another aspect of the disclosed embodiments is an apparatus for encoding a video signal having at least one frame, each frame having a plurality of blocks, each block having a plurality of pixels. The apparatus comprises a memory and at least one processor configured to execute instructions stored in the memory to: identify a first frame from the plurality of frames as an I-frame, the first frame having an original resolution, determine a variance for the first frame, and if the variance exceeds an intra threshold: select a frame resolution for the first frame that is less than the original resolution, and encode the first frame using the selected frame resolution.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

This Application hereby incorporates by reference in the entirety the following: co-pending U.S. patent application Ser. No. 13/095,967 filed on Apr. 28, 2011 and entitled "METHOD AND APPARATUS FOR ENCODING VIDEO BY DETERMINING BLOCK RESOLUTION", co-pending U.S. patent application Ser. No. 13/096,285 filed on Apr. 28, 2011 and entitled "METHOD AND APPARATUS FOR ENCODING VIDEO USING GRANULAR DOWNSAMPLING OF FRAME RESOLUTION".

Figure 1:
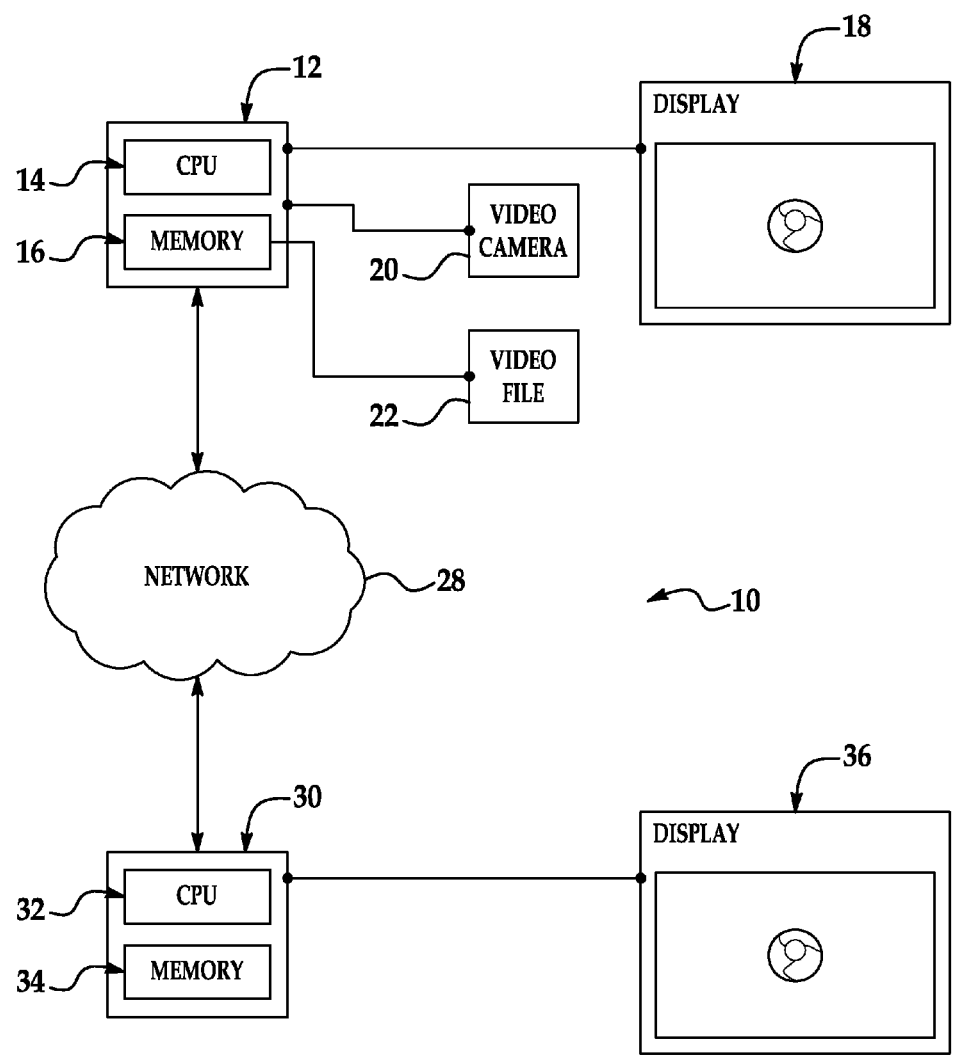
FIG. 1 is a schematic of a video encoding and decoding system.

FIG. 1 is a diagram of an encoder and decoder system 10 for still or dynamic video images. An exemplary transmitting station 12 may be, for example, a computer having an internal configuration of hardware including a processor such as a central processing unit (CPU) 14 and a memory 16. CPU 14 can be a controller for controlling the operations of transmitting station 12. The CPU 14 is connected to memory 16 by, for example, a memory bus. Memory 16 may be random access memory (RAM) or any other suitable memory device. Memory 16 can store data and program instructions which are used by the CPU 14. Other suitable implementations of transmitting station 12 are possible.

A display 18 configured to display a video stream can be connected to transmitting station 12. Display 18 may be implemented in various ways, including by a liquid crystal display (LCD) or a cathode-ray tube (CRT). Display 18 may also be configured for other uses, such as screencasting. Alternatively, or in addition to display 18, a video stream can be generated from a video camera 20 or received from a video file 22 and can be transferred to transmitting station 12.

A video stream can consist of a number of adjacent video frames (i.e. images), which may be still or dynamic. Adjacent video frames can be further subdivided into a single frame. At the next level, the frame can be divided into a series of blocks, which contain data corresponding to, for example, a 16×16 block of displayed pixels. Each block can contain luminance and chrominance data for the corresponding pixels. The blocks can also be of any other suitable size such as 16×8 pixel groups or 8×16 pixel groups. In other embodiments, video stream may only include a single frame and may be in applications such as screencasting.

A network 28 connects transmitting station 12 and a receiving station 30 for encoding and decoding of the video stream. Specifically, the video stream can be encoded by an encoder in transmitting station 12 and the encoded video stream can be decoded by a decoder in receiving station 30. Network 28 may, for example, be the Internet. Network 28 may also be a local area network (LAN), wide area network (WAN), virtual private network (VPN), or any other means of transferring the video stream from transmitting station 12.

Receiving station 30, in one example, may be a computer having an internal configuration of hardware include a processor such as a central processing unit (CPU) 32 and a memory 34. CPU 32 is a controller for controlling the operations of transmitting station 12. CPU 32 can be connected to memory 34 by, for example, a memory bus. Memory 34 may be RAM or any other suitable memory device. Memory 34 stores data and program instructions which are used by CPU 32. Other suitable implementations of receiving station 30 are possible.

Figure 2:
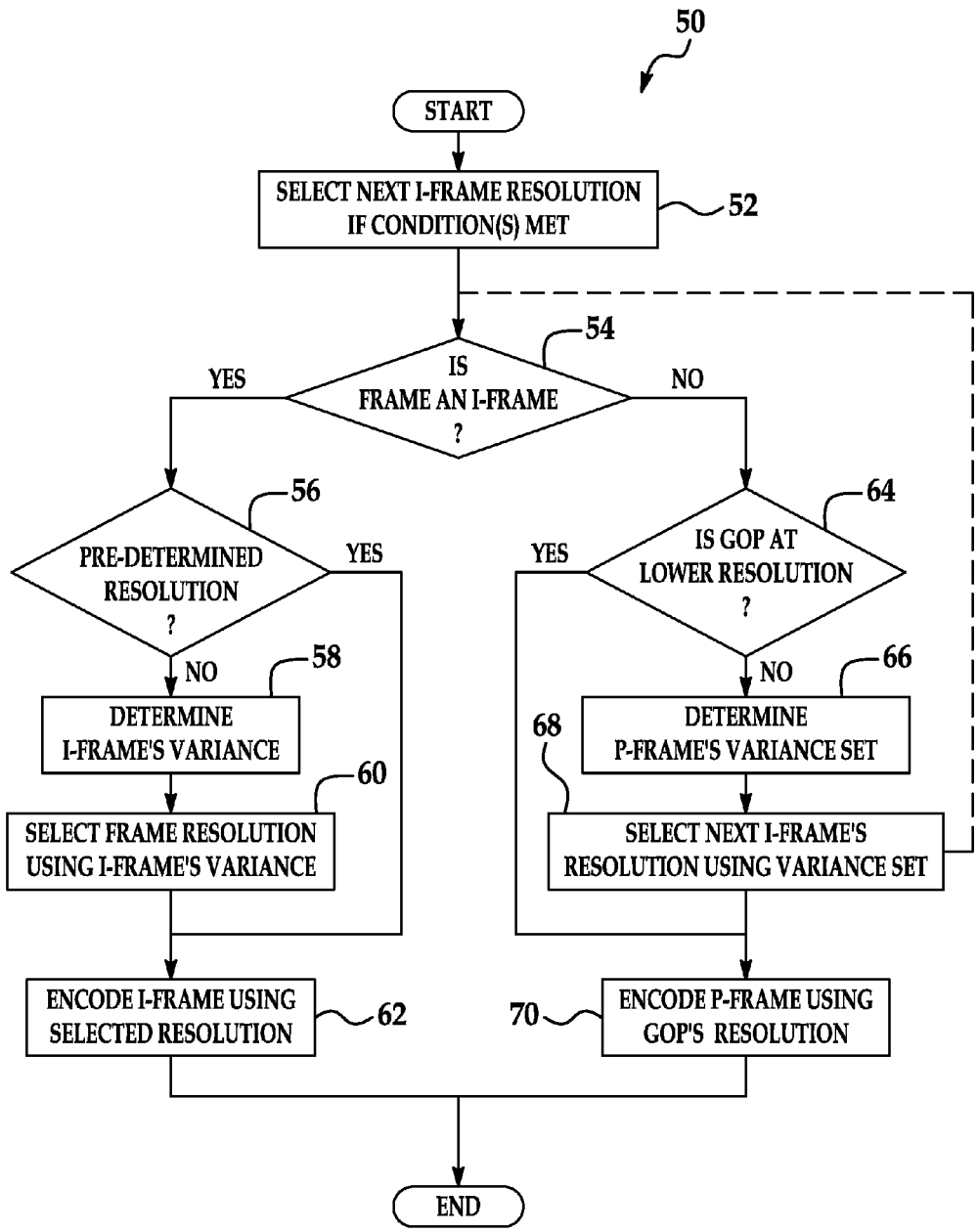
FIG. 2 is a flow chart of a method of encoding in the video encoding and decoding system of FIG. 1.

FIG. 2 is a flow chart of a method 50 of encoding by an encoder. The encoder can be implemented on the transmitting station 12. The method 50 can be directed towards use within standard encoding schemes, including those that have been listed previously. However, the method 50 can be used with any encoding scheme. Standard encoding schemes provide the ability to encode a group of pictures (GOP) (i.e. a group of frames including an I-frame at the start of the group) at a lower pixel resolution than other GOPs in a digital video stream. An I-frame is a frame that is encoded without reference to any other frame. Other frames, such as P-frames are at least partially encoded with reference to another frame.

The method 50 describes a process for determining whether to encode a GOP at the lower pixel resolution based on frame variance. Encoding a GOP at the lower pixel resolution reduces the bitrate of the encoded GOP and can provide a higher quality encoding at a target bitrate (even if quantization is employed) when the variance of frames are high as compared to the sole use of quantization to achieve a target bitrate of the encoded GOP.

For a current frame in a digital video stream, the encoder first checks if conditions are met to set a pre-determined resolution for the next I-frame in the digital video stream (52). The conditions function as a "watchdog" to revert encoding of the digital video stream from a lower pixel resolution to the original resolution of the frames or to force encoding at a lower pixel resolution when warranted. The conditions can be based on the encoding of a set of P-frames (coming before the current frame) in the current frame's GOP or the previous frame's GOP (for example, where the current frame is an I-frame in a fixed-length GOP encoding).

The following are examples of when the pre-determined resolution is set. In one implementation, the P-frames in the set of P-frames are encoded, at least partially, with respect to a previously encoded frame. As described later, a variance set can be calculated for each P-frame, including an intra-prediction variance and an inter-prediction variance. For example, if the variances in the set of P-frames are mostly small values, the conditions are met to set the pre-determined resolution for the next I-frame to the original resolution of the frames in the digital video stream. Alternatively, if the variances in the set of P-frames are mostly large values, the conditions are met to set the pre-determined resolution for the next I-frame to the lower pixel resolution of the frames in the digital video stream. An encoder can implement both, one, or none of these conditions, depending on the implementation.

In another implementation, the encoder can determine, for example, whether the variances are mostly small values or mostly large values by considering one or both of the variances, and by comparing an aggregate (e.g. the sum, average, or any other aggregate) of those variances to a lower watchdog threshold value and an upper watchdog threshold value. For example, if the aggregate of variances is less than the lower watchdog threshold value, the pre-determined resolution is set to the original resolution. In another example, if the aggregate of variances is greater than the upper watchdog threshold value, the pre-determined resolution is set to the lower resolution. In another example, if neither condition is met, the pre-determined resolution is left as-is.

Alternatively, other methods of evaluating the set of P-frames to determine the pre-determined resolution may be used. In another implementation, each P-frame in the set can be determined to be complex or non-complex by comparing one variance of each frame to an intermediate threshold value. The intermediate threshold value can be, for example, the inter threshold, the intra threshold, or any other determined threshold. A complexity percentage is then calculated using the number of complex frames and the total number of frames in the set of P-frames. If the percentage is less than a lower watchdog threshold, the pre-determined resolution is set to the original resolution. If the percentage is greater than an upper watchdog threshold value, the pre-determined resolution is set to the lower resolution. If neither condition is met, the pre-determined resolution is left as-is.

Next, the encoder determines whether the current frame is an I-frame (54). The current frame may be an I-frame based on, for example, its position in the digital video stream. The current frame can be an I-frame based on a number of alternative considerations that may or may not be used by the encoder. For example, the current frame could be an I-frame if requested by the receiving station 24, or if the pre-determined resolution is set. However, some encoding schemes may require that a GOP be of a fixed length. In these encoding schemes, the I-frame determination would be based on a number of frames since the last I-frame.

If the current frame is an I-frame, the encoder checks if there is a pre-determined resolution set (56). If there is not a pre-determined resolution set, the encoder determines the variance of the current frame (58). A method of determining an I-frame variance is described in more detail later with respect to FIG. 3. Next, the encoder selects the frame resolution (for encoding the current frame and the GOP) based on the variance of the current frame (60). A method of selecting the frame resolution is described in more detail later with respect to FIG. 4.

Once the frame resolution of the current frame is selected or if there is a pre-determined resolution (from stage 56), the I-frame is encoded using the selected frame resolution or the pre-determined resolution (62). The encoding process can be performed using any encoding scheme, such as various standard video encoding schemes presently available. The encoding process may be performed in parallel to the remainder of method 50. For example, the encoding of stage 62 may be performed on one processor in a computer, whereas the other stages of method 50 may be performed on another processor. Such a scheme would allow for the encoding of a first frame while method 50 determines the resolution of a next frame. Once the current frame is encoded, the method 50 ends.

Returning to stage 54, if the current frame is not an I-frame, the encoder determines whether the current frame's GOP is being encoded at a resolution less than the original resolution (64). If the GOP is at the original resolution, the encoder determines a variance set for the current frame (66). A method of determining a P-frame variance is described in more detail later with respect to FIG. 5. Next, the encoder selects the resolution of the next I-frame based on the variance set (68). A method of selecting the resolution of the next I-frame is described in more detail later with respect to FIG. 6. Once the next I-frame resolution is selected, the pre-determined resolution is set using the selected next I-frame resolution. However, there may not be a next I-frame resolution. In such a case, the pre-determined resolution remains unset if it was not previously set, and remains at its previous value if it was previously set.

Once the resolution of the next I-frame is selected or if the current frame's GOP is being encoded at a lower resolution (from stage 64), the encoder encodes the current frame using the GOP's selected frame resolution (70). As described previously with respect to stage 62, the encoding of the current frame in stage 70 may be performed on one processor in a computer, whereas the other stages of method 50 may be performed on another processor. Such a scheme would allow for the encoding of a first frame while method 50 determines the resolution of a next frame. Once the current frame is encoded, the method 50 ends.

Referring again back to stage 68, instead of encoding the current frame (stage 70), the encoder can alternatively redefine the current frame as an I-frame and return to stage 54 (as shown by the dotted line). To do so, the encoder must use an encoding scheme that allows for GOPs having varying numbers of frames in the encoded digital video stream.

Figure 3:
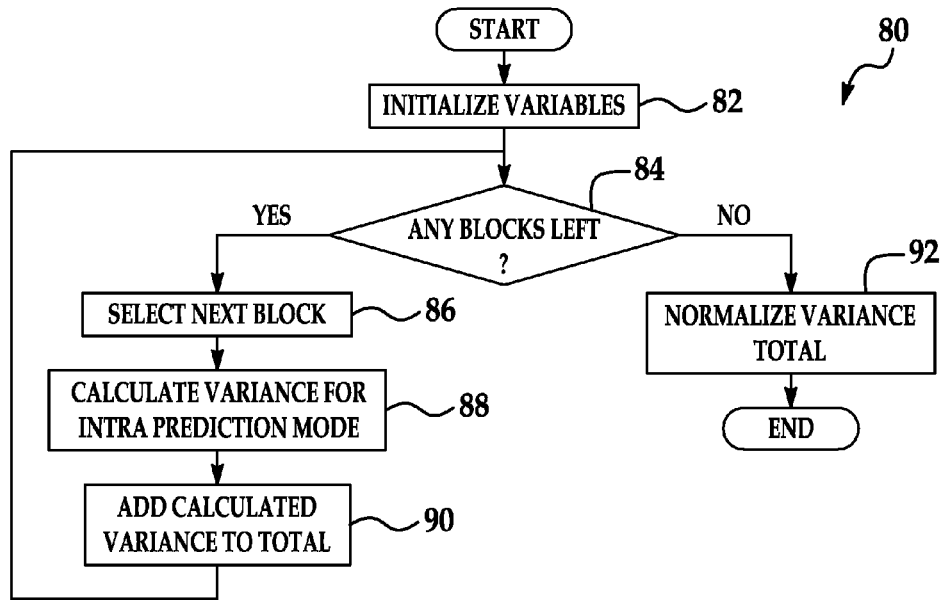
FIG. 3 is a flow chart of a method of determining an I-frame variance.

FIG. 3 is a flow chart of a method 80 of determining an I-frame variance. The encoder first can initialize any variables needed to determine the I-frame variance (82). Variables can include, for example, those for an intra-prediction variance and an intra-prediction variance total. Next, the encoder determines if there are any blocks left to process in the current frame (84). If so, the encoder selects the next block in the current frame (86). Blocks can be selected in any order, including raster order. The encoder then calculates the intra-prediction variance for the selected block (88).

The intra-prediction variance can be calculated by performing intra prediction on the blocks in the current frame. Intra prediction can be based on previously coded image samples within the current frame. Intra prediction can be performed on a current block by, for example, copying pixels (or filtered pixels) from adjacent, previously coded blocks to form a predicted block. The manner in which the pixels are copied can be by vertical prediction, horizontal prediction, DC prediction, True Motion prediction, southwest prediction, southeast prediction, vertical right diagonal prediction, vertical left diagonal prediction, horizontal down prediction, horizontal up prediction, etc.

Intra prediction can also be performed using a technique other than copying pixel values. For example, a predicted block can be formed for a current block using one or more parameterized equations. These parameterized equations can be, for example, an expression representing a curve that has a "best fit" to a defined set of previously coded pixels in the frame. Other techniques of determining a predicted block using intra prediction are also possible.

A residual block is determined based on the difference between the predicted block and the best-matching block. The intra-prediction variance can then be calculated using the below equations:

$$\text{mean} = \frac{\sum_{i=0} \sum_{j=0} p_{i,j}}{N}; \text{wherein} \quad (1)$$

i is a x-coordinate within the residual block;
j is a y-coordinate within the residual block;
$p_{i,j}$ is a value of a pixel located at the coordinates of i, j within the residual block; and
N is a number of pixels within the residual block. In addition, $$\text{intra} - \text{prediction variance} = \frac{\sum_{i=0} \sum_{j=0} |p_{i,j} - \text{mean}|}{N} \quad (2)$$

The mean for the residual block is first calculated by averaging the values of all pixels within the residual block. The intra-prediction variance is then calculated by averaging the absolute value of the difference of each pixel from the mean of the residual block. The calculations above are exemplary only, and other similar means of determining the intra-prediction variance may be utilized.

The encoder next adds the calculated intra-prediction variance for the selected block to the intra-prediction variance total for the current frame (90). The encoder then returns to determine whether additional blocks are available within the current frame (stage 84). Once there are no blocks left to process, the encoder then normalizes the intra-prediction variance total (92). Normalization is used to equalize the scale of the intra-prediction variance total with the intra threshold that it will be later compared with. For example, the intra threshold may be of a per-block scale. In such a case, the intra-prediction variance total would be normalized by dividing it by the number of blocks in the current frame, and that result would be used as the frame's variance. In another example, the intra threshold may be of a per-frame scale. In such a case, the intra-prediction variance total would be normalized by leaving the intra-predicting variance total as-is and using it directly as the frame's variance.

Figure 4:
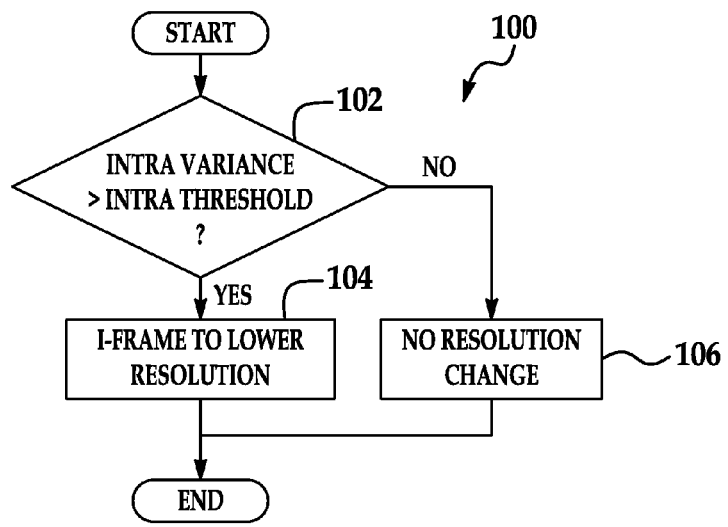
FIG. 4 is a flow chart of a method of selecting an I-frame resolution based on a I-frame variance.

FIG. 4 is a flow chart of a method 100 of selecting an I-frame resolution based on an I-frame variance. The encoder will determine whether the current frame's intra-prediction variance (its variance) is greater than an intra threshold (102). The intra threshold is a pre-determined value that can be calculated using the method described later with respect to FIG. 7. If the variance is greater than the threshold, the current frame (I-frame) is encoded at a resolution less than the original resolution (104). Otherwise, no change is made to the current frame's resolution (106). In other words, the frame is encoded at its original resolution.

Figure 5:
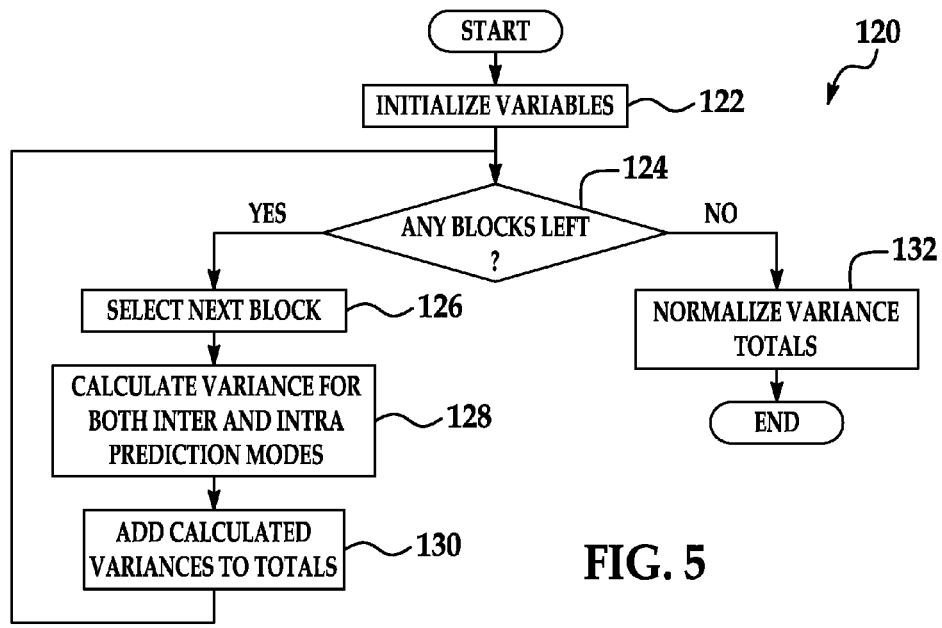
FIG. 5 is a flow chart of a method of determining a P-frame variance set.

FIG. 5 is a flow chart of a method 120 of determining a P-frame variance. The encoder first can initialize any variables needed to determine the P-frame variance (122). Variables can include, for example, those for an inter-prediction variance, intra-prediction variance, intra-prediction variance total, and an inter-prediction variance total. Next, the encoder determines if there are any blocks left to process in the current frame (124). If so, the encoder selects the next block in the current frame (126). Blocks can be selected in any order, including raster order. The encoder then calculates the intra-prediction variance and the inter-prediction variance for the selected block (128).

As described before, the intra-prediction variance can be calculated by copying pixel values from previously coded blocks, using a parameterized equation or any other possible technique. A residual block is determined based on the difference between the predicted block and the best-matching block. The intra-prediction variance can then be calculated using equations (1) and (2) above or by an equivalent set of calculations.

The inter-prediction variance can be calculated by first performing an inter-frame motion vector search for a best-matching block in a reference frame. The reference frame can be any reference frame available in the encoding scheme used, including a last frame, a last I-frame, or an alternative reference frame. A residual block is determined based on the difference between the current block and the best-matching block. A motion vector is also encoded that describes the position of the best-matching block relative to the position of the current block. The inter-prediction variance can then be calculated using equations (1) and (2) above or by an equivalent set of calculations.

In one embodiment, the inter-prediction variance can be replaced by the intra-prediction variance. The inter-prediction variance is replaced when the intra-prediction is the smallest variance of the two. The replacement can be done because an inter-predicted frame may contain blocks that are both inter predicted and intra predicted. In this case, the encoder may take this into account by using the intra-prediction variance if it finds a better matching block than can be found using inter prediction.

The encoder next adds the calculated intra-prediction variance for the selected block to the intra-prediction variance total for the current frame and adds the calculated inter-prediction variance for the selected block to the inter-prediction variance total for the current frame (130). The encoder then returns to determine whether additional blocks are available within the current frame (stage 124). Once there are no blocks left to process, the encoder then normalizes the intra-prediction variance total and the inter-prediction variance total (122). The normalization process is the same as that described previously with respect to stage 92. The normalized intra-prediction variance total is the intra variance and the normalized inter-prediction variance total is the inter variance. The intra variance and the inter variance together form the variance set of the current frame.

Figure 6:
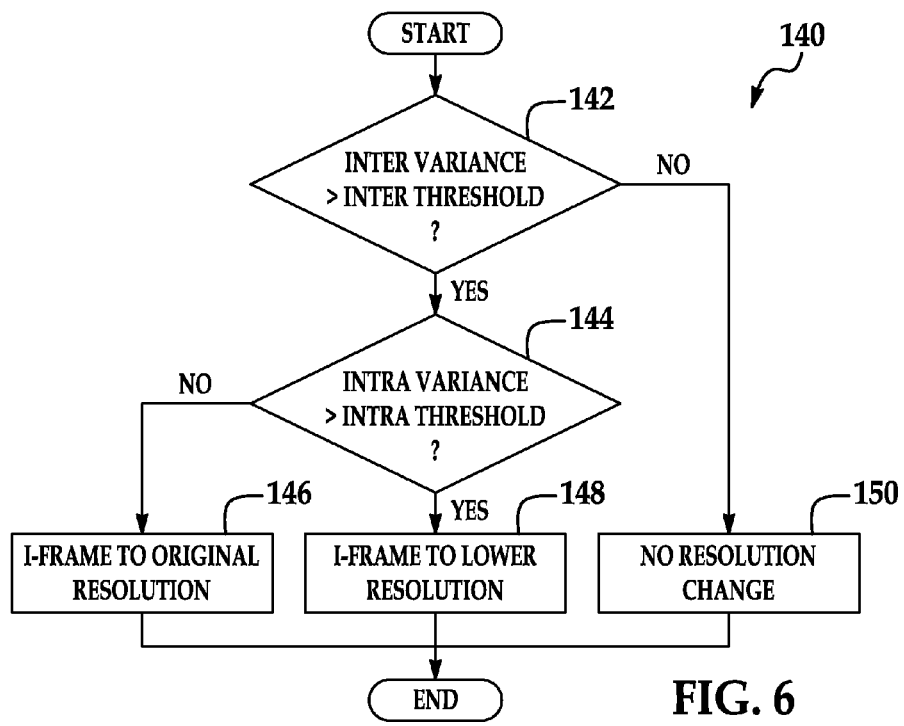
FIG. 6 is a flow chart of a method of selecting a next I-frame resolution (pre-determined resolution) based on a P-frame variance set.

FIG. 6 is a flow chart of a method 140 of selecting a next I-frame resolution (pre-determined resolution) based on a P-frame variance set. As described before, the variance set includes an inter variance and an intra variance. The encoder will determine whether the inter variance is greater than an inter threshold (142). The inter threshold is a pre-determined value than can be calculated using the method described later with respect to FIG. 8. If the variance is not greater than the threshold, the encoder next determines whether the intra variance is greater than an intra threshold (144). The intra threshold is a pre-determined value that can be calculated using the method described later with respect to FIG. 7.

If the intra variance is not greater than the intra threshold, the next I-frame resolution is set to the original resolution (146). Otherwise, if it is greater, the next I-frame resolution is set to a resolution less than the original resolution (148). And referring back to stage 142, if the inter variance is not greater than the inter threshold, the next I-frame resolution is left as-is (150).

Figure 7:
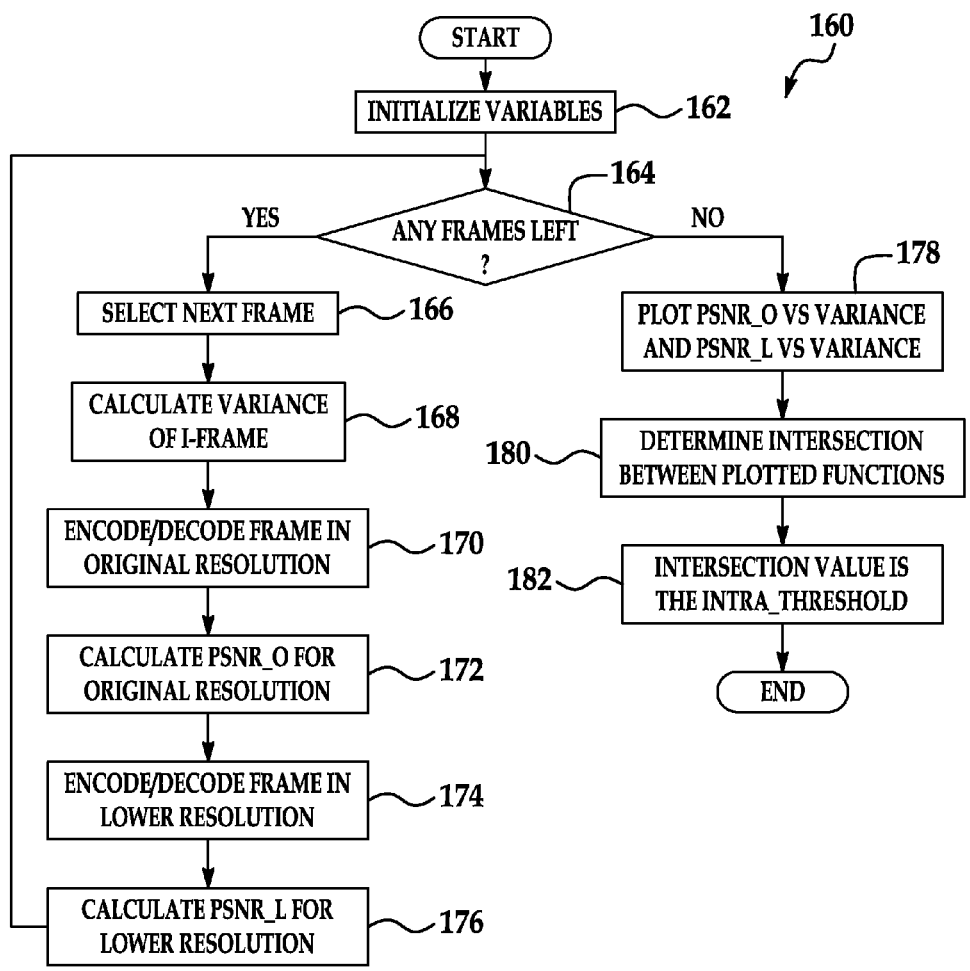
FIG. 7 is a flow chart of a method of determining an intra threshold.

FIG. 7 is a flow chart of a method 160 of determining an intra threshold. The intra threshold can be a pre-determined value that is determined by method 160 and then included in the encoder. First, any variables needed to determine the intra threshold can be initialized (102). Such variables can include, for example, one or more arrays for PSNR_O, PSNR_L, and frame variance, which will be discuss in more detail below.

The method 160 operates on a test sequence of frames. The test sequence of frames can contain video data similar to that expected to be encoded. For example, in a screen casting encoding application, the test sequence of frames could be an exemplary screen casting video data stream. In another example, if an encoder could be used for screen casting and for encoding of moving pictures (i.e. video clips and/or movies), the test sequence of frames can include both a screen casting video data stream and a moving picture video data stream. The test sequence of frame can also be based on video data from other sources.

Once variables are initialized, the method 160 next checks to see if any frames are left to process in the test sequence of frames (164). If there is at least one frame left, the next frame for processing is selected (166). The variance of the selected frame is calculated using a method such as method 80 of determining an intra frame variance (168). The selected frame is encoded and then decoded using its original resolution (170). The encoding is performed to create an encoded frame that is within a target bitrate.

An original resolution peak signal-to-noise-ratio (PSNR_O) will be calculated using the frame and the decoded frame (172). A PSNR value is a measure of quality comparing the original frame and a lossy-encoded reconstructed (decoded) frame. In this case, the PSNR_O measures the quality of the resulting decoded frame after being compressed to the target bitrate using techniques other than the changing of pixel resolution (i.e. quantization).

The PSNR can be calculated using a mean squared error (MSE). The PSNR alternatively can be calculated using other means. One exemplary equation for calculating the MSE and PSNR is provided:

$$MSE = \frac{1}{mn} \sum_{i=0}^{m-1} \sum_{j=0}^{n-1} [S(i,j) - D(i,j)]^2 : \text{wherein} \quad (3)$$

i is a x-coordinate;
j is a y-coordinate;
S is the selected frame;
D is the decoded frame;
m is the width of the frames S and D;
n is the height of the frames S and D.
D is the decoded frame. In addition, $$PSNR = 10 \log_{10}\left(\frac{MAX_S^2}{MSE}\right) : \text{wherein} \quad (4)$$

$MAX_S$ is the maximum possible pixel value of the selected frame.

Once the PSNR_O has been calculated, the selected frame will be downsampled to a resolution less than the original resolution, the downsampled frame will be encoded and then decoded, and the decoded downsampled frame will then be upsampled to the original resolution (174). As with the encoding of the original resolution frame, the encoding of the downsampled frame is performed using a target bitrate. The purpose is to create a decoded upsampled frame for comparison with the selected frame. The resolution of the downsampled frame can be determined using one or more predetermined lower resolutions. Alternatively, the resolution of the downsampled frame can be determined on a frame-by-frame basis, selected by a user or any other technique.

A lower resolution peak signal-to-noise-ratio (PSNR_L) is then calculated (176). In this case, the PSNR_L measures the quality of the resulting decoded upsampled frame after being compressed to the target bitrate using the technique of changing the pixel resolution.

Once the intra variance, PSNR_O, and PSNR_L have been calculated for the selected frame, the method 160 returns to stage 164 to determine if any additional frames are available in the test sequence of frames. Once there are no frames left, the method 160 includes plotting the variance, PSNR_O, and PSNR_L values calculated for each frame (178). The plot includes two series of data. The first series includes the variance for each frame versus the PSNR_O value for each frame. The second series includes the variance for each frame versus the PSNR_L value for each frame.

The first and second series can be plotted using fitted curve techniques. For example, an approximate fitted curve function can be determined to approximate each series. The fitted curve techniques used can include techniques such as the least squares method. Alternatively, the first and second series can be plotted using their actual values. Plotting may not involve the actual placement of data points on a coordinate plane. Rather, plotting may merely be an intermediate step performed by a processor.

Next, an intersection between the first series and the second series is determined (180). The intersection may be determined computationally by a processor based on the fitted curves determined for each series. But the intersection can also be determined using other methods. For example, a programmer or other person may select the intersection based on a plot of each series on a coordinate plane. The selected intersection is the intra threshold (182). Alternatively, the selected intersection's value may be multiplied by a constant or processed by a standard function to normalize it for use in the encoder as the intra threshold.

Figure 8:
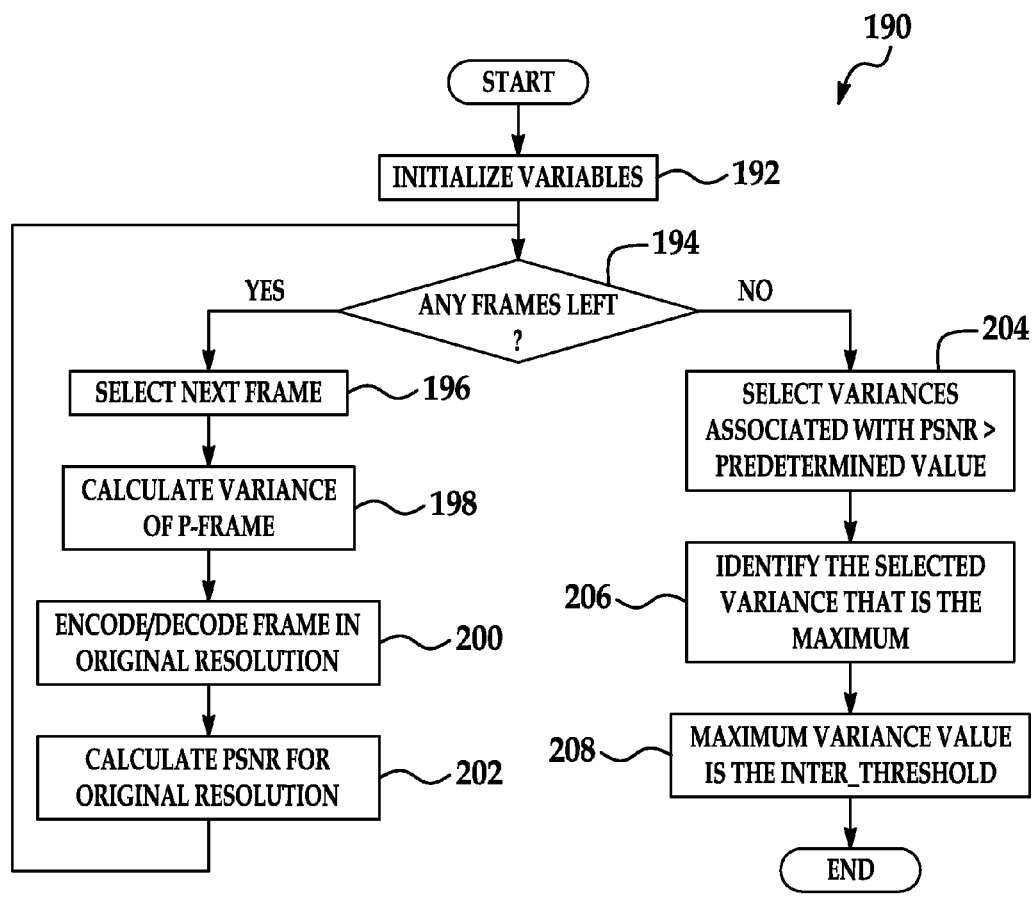
FIG. 8 is a flow chart of a method of determining an inter threshold.

FIG. 8 is a flow chart of a method 190 of determining an inter threshold. The inter threshold can be a pre-determined value that is determined by method 190 and then included in the encoder. First, any variables needed to determine the inter threshold can be initialized (192). Such variables can include, for example, one or more arrays for PSNR and frame variance.

The method 190 operates on a test sequence of frames. The test sequence of frames can contain video data similar to that expected to be encoded. For example, in a screen casting encoding application, the test sequence of frames could be an exemplary screen casting video data stream. In another example, if an encoder could be used for screen casting and for encoding of moving pictures (i.e. video clips and/or movies), the test sequence of frames can include both a screen casting video data stream and a moving picture video data stream.

Once variables are initialized, the method 190 next checks to see if any frames are left to process in the test sequence of frames (194). If there is at least one frame left, the next frame for processing is selected (196). The variance of the selected frame is calculated using a method such as method 120 that includes determining an inter frame variance (198). The selected frame is encoded and then decoded using its original resolution (200). The encoding is performed to create an encoded frame that is within a target bitrate.

A peak signal-to-noise-ratio (PSNR) will be calculated using the frame and the decoded frame (202). As discussed previously, a PSNR value is a measure of quality comparing the original frame and a lossy-encoded reconstructed (decoded) frame. In this case, the PSNR measures the quality of the resulting decoded frame after being compressed to the target bitrate using techniques other than the changing of pixel resolution (i.e. quantization). The PSNR can be calculated using a MSE, such as described previously.

Once the inter variance and PSNR have been calculated for the selected frame, the method 190 returns to stage 194 to determine if any additional frames are available in the test sequence of frames. Once there are no frames left, a candidate variance set is selected that contains a series of inter variances and PSNR values for frames where the PSNR value exceeds a PSNR threshold (204). The candidate variance set can alternately include only the selected inter variances. The largest variance in the candidate variance set is then identified (206). This identified maximum (largest) variance value is the inter threshold (208). Alternatively, the identified maximum variance value may be multiplied by a constant or processed by a standard function to normalize it for use in the encoder as the inter threshold.

The above-described embodiments of encoding or decoding may illustrate some exemplary encoding techniques. However, in general, encoding and decoding as those terms are used in the claims are understood to mean compression, decompression, transformation or any other change to data whatsoever.

The embodiments of transmitting station 12 and/or receiving station 30 (and the algorithms, methods, instructions etc. stored thereon and/or executed thereby) can be implemented in hardware, software, or any combination thereof including, for example, IP cores, ASICS, programmable logic arrays, quantum or molecular processors, optical processors, programmable logic controllers, microcode, firmware, microcontrollers, servers, microprocessors, digital signal processors or any other suitable circuit. In the claims, the term "processor" should be understood as encompassing any the foregoing devices, either singly or in combination. The terms "signal" and "data" are used interchangeably. Further, portions of transmitting station 12 and receiving station 30 do not necessarily have to be implemented in the same manner.

Further, in one embodiment, for example, transmitting station 12 or receiving station 30 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Transmitting station 12 and receiving station 30 can, for example, be implemented on computers in a screencasting system. Alternatively, transmitting station 12 can be implemented on a server and receiving station 30 can be implemented on a device separate from the server, such as a handheld communications device (i.e. a cell phone). In this instance, transmitting station 12 can encode content using an encoder into an encoded video signal and transmit the encoded video signal to the communications device. In turn, the communications device can then decode the encoded video signal using a decoder. Alternatively, the communications device can decode content stored locally on the communications device (i.e. no transmission is necessary). Other suitable transmitting station 12 and receiving station 30 implementation schemes are available. For example, receiving station 30 can be a personal computer rather than a portable communications device.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal having a plurality of frames, each frame having a plurality of blocks, the method comprising:
   identifying a first frame from the plurality of frames as an I-frame, the first frame having an original resolution;
   determining a variance for the first frame using a processor;
   if the variance exceeds an intra threshold:
   selecting a frame resolution for the first frame that is less than the original resolution;
   if the variance does not exceed the intra threshold:
   selecting the frame resolution for the first frame as the original resolution; and
   encoding the first frame using the selected frame resolution.

2. The method of claim 1, further comprising:
   identifying a second frame from the plurality of frames as a P-frame, the second frame being after the first frame and wherein the P-frame is a frame at least partially encoded with reference to another frame.

3. The method of claim 2, further comprising:
   encoding the second frame using the frame resolution for the first frame.

4. The method of claim 2, further comprising:
   if the frame resolution is less than the original resolution:
   determining a variance set for the second frame;
   selecting a pre-determined resolution using the variance set; and
   encoding a next I-frame using the pre-determined resolution.

5. The method of claim 4, wherein encoding a next I-frame using the pre-determined resolution comprises:
   redefining the second frame as an I-frame; and
   encoding the second frame using the pre-determined resolution.

6. The method of claim 4, wherein determining the variance set for the second frame comprises:
   calculating an inter-prediction variance for at least some of the blocks in the second frame;
   calculating an intra-prediction variance for at least some of the blocks in the second frame;
   calculating an inter-prediction variance total;
   calculating an intra-prediction variance total; and
   normalizing the inter-prediction variance total and the intra-prediction variance total.

7. The method of claim 6, wherein calculating the inter-prediction variance total comprises:
   calculating the inter-prediction variance total using a smallest variance for each block, the smallest variance of each block being the smallest of the inter-prediction variance and the intra-prediction variance.

8. The method of claim 6, wherein selecting the pre-determined resolution comprises:
   if an inter threshold is less than the normalized inter-prediction variance total and an intra threshold is less than the normalized intra-prediction variance total:
   selecting the pre-determined resolution that is less than the original resolution.

9. The method of claim 6, wherein selecting the pre-determined resolution comprises:
   if an inter threshold is less than the normalized inter-prediction variance total and an intra threshold is not less than the normalized intra-prediction variance total:
   selecting the pre-determined resolution as the original resolution.

10. The method of claim 1, wherein selecting the frame resolution for the first frame that is less than the original resolution comprises:
    selecting from one or more pre-determined lower resolutions that are less than the original resolution.

11. The method of claim 1, wherein determining the variance comprises:
    calculating an intra-prediction variance for at least some of the blocks in the first frame;
    calculating an intra-prediction variance total; and
    normalizing the intra-prediction variance total.

12. The method of claim 1, further comprising:
    encoding each P-frame within a set of P-frames after the first frame, each encoded P-frame having at least one variance and wherein each P-frame is a frame at least partially encoded with reference to another frame; and
    if the variances of the set of P-frames are mostly small values:
    selecting a pre-determined resolution as the original resolution, and
    encoding a next I-frame using the pre-determined resolution.

13. The method of claim 1, further comprising:
    encoding each P-frame within a set of P-frames after the first frame, each encoded P-frame having at least one variance and wherein each P-frame is a frame at least partially encoded with reference to another frame; and
    if the variances of the set of P-frames are mostly large values:
    selecting a pre-determined resolution that is less than the original resolution, and
    encoding a next I-frame using the pre-determined resolution.

14. The method of claim 1, further comprising:
    identifying a sequence of test frames, the test frames in the sequence of test frames having an original resolution;
    calculating at least one variance for at least one test frame in the sequence;
    calculating at least one first peak signal-to-noise ratio (PSNR) for the at least one test frame using the original resolution; and
    determining at least the intra threshold using the variances and first PSNRs.

15. The method of claim 14, wherein the variances are intra-prediction variances and determining the intra threshold comprises:

calculating a second PSNR for the at least one test frame using a lower resolution that is less than the original resolution; and determining the intra threshold using the variances, first PSNRs, and second PSNRs.

16. The method of claim 15, wherein calculating the first PSNR for the at least one test frame comprises:
selecting a test frame from the sequence of test frames;
encoding the selected test frame;
decoding the encoded test frame; and
calculating the first PSNR using the selected test frame and the decoded test frame.

17. The method of claim 16, wherein encoding the selected test frame uses a target bitrate.

18. The method of claim 15, wherein calculating the second PSNR for the at least one test frame comprises:
selecting a test frame from the sequence of test frames;
determining a downsampled test frame at the lower resolution from the selected test frame;
encoding the downsampled test frame;
decoding the encoded downsampled test frame;
determining a decoded upsampled test frame at the original resolution using the decoded downsampled test frame; and
calculating the second PSNR using the selected test frame and the decoded upsampled test frame.

19. The method of claim 18, wherein encoding the downsampled test frame uses a target bitrate.

20. The method of claim 15, wherein determining the intra threshold using the variances, first PSNRs, and second PSNRs comprises:
identifying a first series comprising the variances and the first PSNRs;
identifying a second series comprising the variances and the second PSNRs;
determining an intersection between the first series and the second series; and
determining the intra threshold using the intersection.

21. The method of claim 20, wherein determining the intersection between the first series and the second series comprises:
determining a first fitted curve from the first series;
determining a second fitted curve from the second series; and
determining the intersection as a value at which the first fitted curve and the second fitted curve intersect.

22. The method of claim 14, wherein determining at least the intra threshold comprises determining an inter threshold, the variances are inter-prediction variances, and determining the inter threshold comprises:
selecting into a candidate variance set the inter-prediction variance for each test frame having a first PSNR greater than a first PSNR threshold;
selecting a largest variance from the candidate variance set; and
determining the inter threshold using the largest variance.

23. An apparatus for encoding a video signal having at least one frame, each frame having a plurality of blocks, each block having a plurality of pixels, the apparatus comprising:
a memory; and
at least one processor configured to execute instructions stored in the memory to:
identify a first frame from the plurality of frames as an I-frame, the first frame having an original resolution;
determine a variance for the first frame, and;
if the variance exceeds an intra threshold:
select a frame resolution for the first frame that is less than the original resolution;
if the variance does not exceed the intra threshold:
select the frame resolution for the first frame as the original resolution; and
encode the first frame using the selected frame resolution.

24. The apparatus of claim 23, wherein the at least one processor comprises a first processor and a second processor, each processor configured to execute at least some of the instructions stored in the memory.

* * * * *